United States Patent
Dong (10) Patent No.: US 12,368,377 B2
(45) Date of Patent: Jul. 22, 2025

(54) MULTI-VOLTAGE DRIVING CONTROL METHOD, APPARATUS, AND DEVICE, AND COMPUTER-READABLE STORAGE MEDIUM

(71) Applicant: SHENZHEN INTELTRON INTELLIGENT SCIENCE & TECHNOLOGY CO., LTD., Shenzhen (CN)

(72) Inventor: Yangsheng Dong, Qichun (CN)

(73) Assignee: SHENZHEN INTELTRON INTELLIGENT SCIENCE & TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/967,666

(22) Filed: Dec. 4, 2024

(65) Prior Publication Data
US 2025/0096677 A1    Mar. 20, 2025

(30) Foreign Application Priority Data
Oct. 16, 2024   (CN) .......................... 202411442066.6

(51) Int. Cl.
    *H02M 3/156*    (2006.01)
(52) U.S. Cl.
    CPC ................................. *H02M 3/156* (2013.01)
(58) Field of Classification Search
    CPC ....................................................... H02M 5/25
    See application file for complete search history.

(56) References Cited

U.S. PATENT DOCUMENTS

| | | | |
|---|---|---|---|
| 6,108,226 A * | 8/2000 | Ghosh | H02J 3/241 363/142 |
| 8,094,471 B1 * | 1/2012 | Smith | H02M 1/10 363/61 |
| 10,044,285 B1 * | 8/2018 | Xiong | H02M 5/293 |
| 2014/0064455 A1 | 3/2014 | Park et al. | |
| 2015/0230298 A1 | 8/2015 | Chu et al. | |
| 2019/0103046 A1 | 4/2019 | Gao et al. | |

* cited by examiner

*Primary Examiner* — Jeffrey S Zweizig
(74) *Attorney, Agent, or Firm* — Hemisphere Law, PLLC; Zhigang Ma (57) ABSTRACT

The present disclosure relates to a multi-voltage driving control method, apparatus, and device, and a computer-readable storage medium. The multi-voltage driving control method includes the following steps: obtaining a voltage sample of a mains supply, and determining a voltage region corresponding to the voltage sample; determining a driving circuit corresponding to the voltage region according to the voltage region and a default working voltage region; and controlling an electrical appliance to operate by the driving circuit. According to the multi-voltage driving control method provided by the present disclosure, a working voltage range of a mains supply is determined by detecting the mains supply in an electricity use environment; a working state of a circuit is dynamically adjusted according to a change of an input voltage of an electrical appliance, thereby achieving stable work of the electrical appliance in a multi-voltage environment.

7 Claims, 8 Drawing Sheets

MULTI-VOLTAGE DRIVING CONTROL METHOD, APPARATUS, AND DEVICE, AND COMPUTER-READABLE STORAGE MEDIUM

TECHNICAL FIELD

The present disclosure relates to the technical field of power supply control, and in particular, to a multi-voltage driving control method, apparatus, and device, and a computer-readable storage medium.

BACKGROUND

Portable electrical appliances, such as a foldable fan, a hair dryer, a laptop power supply adapter, or a charger, are often seen in home travel. Especially for those who frequently travel for business, these devices will accompany them for long time. The mains supply in China is 220 V. Due to the long-term efforts of electricians in China, a power supply voltage has become relatively stable. In the last century, the voltage was unstable, and it was common that power outage often occurred. Therefore, household appliances do not require voltage adaptation adjustment, or rather, do not need to undergo complex voltage adaptation adjustment.

However, if some household appliances are used in cross-border geographical ranges, for example, if people who often travel abroad for business use the household appliances, there will be a problem that they cannot use conventional carry-on electrical appliances because the mains supply is significantly different. For example, in Japan, the mains supply is 100 V. In the United State, the mains supply is 110 V. The mains supply in European Union is similar to that of China, which is 220 V. It can be seen that providing an electrical appliance that can quickly adapt to many mains supply regions can obviously improve the convenience of living and working of some people.

SUMMARY

In view of this, it is necessary to provide a multi-voltage driving control method, apparatus, and device, and a computer-readable storage medium for at least one of the above problems.

In a first aspect, the present disclosure provides a multi-voltage driving control method, including the following steps:
  obtaining a voltage sample of a mains supply, and determining a voltage region corresponding to the voltage sample;
  determining a driving circuit corresponding to the voltage region according to the voltage region and a default working voltage region; and
  controlling an electrical appliance to operate by the driving circuit.

In some implementations of the first aspect, the step of obtaining a voltage sample of a mains supply includes:
  acquiring maximum voltages of several mains supplies at a preset time interval, and determining an average value of the maximum voltages; and
  determining the voltage sample according to the average value of the maximum voltages.

In conjunction with the first aspect and the above implementation, in some implementations of the first aspect, the preset time interval is 12 milliseconds.

In conjunction with the first aspect and the above implementation, in some implementations of the first aspect, the step of determining a driving circuit corresponding to the voltage region includes:
  when the voltage region and the default working voltage region have an intersection, determining the driving circuit to be a first circuit; and
  when the voltage region and the default working voltage region have no intersection, determining the driving circuit to be a second circuit.

In conjunction with the first aspect and the above implementation, in some implementations of the first aspect, the first circuit corresponds to a first preset operating parameter table, and the second circuit corresponds to a second preset operating parameter table.

In conjunction with the first aspect and the above implementation, in some implementations of the first aspect, the default working voltage region is 220 V±10%.

In conjunction with the first aspect and the above implementation, in some implementations of the first aspect, the step of controlling an electrical appliance to operate by the driving circuit includes: controlling a motor and/or an electric heater to operate by the driving circuit.

In a second aspect, the present disclosure provides a multi-voltage driving control apparatus, including:
  a sampling module, configured to: obtain a voltage sample of a mains supply, and determine a voltage region corresponding to the voltage sample;
  a circuit selection module, configured to determine a driving circuit corresponding to the voltage region according to the voltage region and a default working voltage region; and
  an operating module, configured to control an electrical appliance to operate by the driving circuit.

In a third aspect, the present disclosure provides a multi-voltage driving control device, including a memory, a processor, and a computer program stored on the memory and runnable on the processor. The processor, when running the program, implements the steps of the multi-voltage driving control method as described in any item of the first aspect of the present disclosure.

In a fourth aspect, the present disclosure provides a computer-readable storage medium, having a computer program stored thereon. The program, when run by a processor, implements the steps of the multi-voltage driving control method as described in any item of the first aspect of the present disclosure.

The technical solutions provided in the embodiments of the present disclosure bring the following beneficial technical effects:

According to the multi-voltage driving control method provided by the present disclosure, a working voltage range of a mains supply is determined by detecting the mains supply in an electricity use environment; a working state of a circuit is dynamically adjusted according to a change of an input voltage of an electrical appliance, thereby achieving stable work of the electrical appliance in a multi-voltage environment. The multi-voltage driving control method is particularly applicable to a portable household appliance for travel, and the generality and convenience of the electrical appliance can be significantly improved.

Additional aspects and advantages of the present disclosure will be set forth in part in the following description, which will be understood in detail from the following description, or will be learned through specific implementations of the present disclosure.

DETAILED DESCRIPTION OF THE EMBODIMENTS

To facilitate understanding the present disclosure, the present disclosure will be described more comprehensively below with reference to related accompanying drawings. Possible embodiments of the present disclosure are provided in the accompanying drawings. However, the present disclosure can be implemented in many different forms, and are not limited to the embodiments described in the drawings. The embodiments that are described with reference to the accompanying drawings are exemplary, are used to make the understanding of the disclosed content of the present disclosure more thorough and comprehensive, and cannot be interpreted as limiting the present disclosure. In addition, if the detailed description of the known technology is not necessary for the features of the present disclosure, these technical details may be omitted.

Those skilled in the related art can understand that unless otherwise defined, all terms (including technical and scientific terms) used herein have the same meaning as commonly understood by a person of ordinary skill in the art to which the present disclosure belongs. It should also be understood that terms such as those defined in general-purpose dictionaries should be understood to have meanings consistent with those in the existing technology, and unless specifically defined as here, they will not be interpreted with idealized or overly formal meanings.

As will be understood by those skilled in the art, the singular forms "a", "an", "one", and "the", as used herein, are intended to include plural forms as well, unless specifically stated otherwise. It should be further understood that the term "include" used in this specification of the present disclosure means the presence of the described features, integers, steps, operations, elements, and/or components, but does not exclude the presence or addition of one or more other features, integers, steps, operations, elements, components, and/or their groups. It should be understood that the term "and/or" used herein includes all or a combination of any unit and all of one or more associated listed items.

The technical solutions of the present disclosure and how to solve the aforementioned technical problems by the technical solutions of the present disclosure will be described in detail below by specific embodiments.

Figure 1:
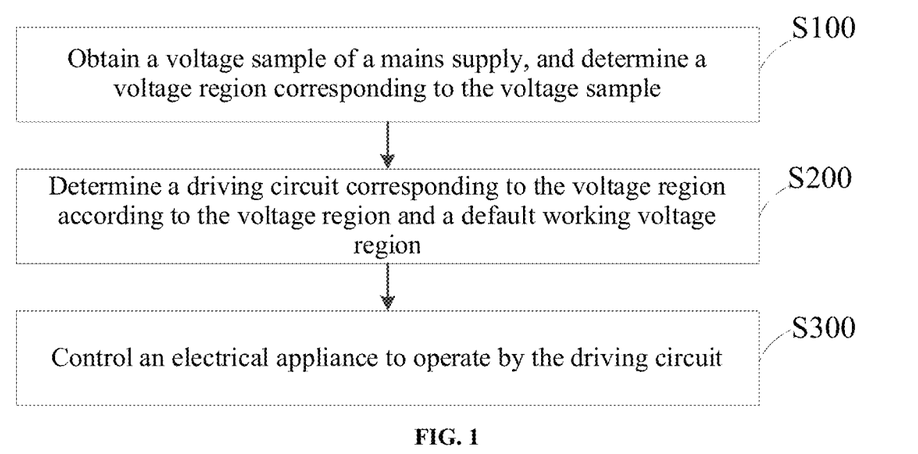
FIG. 1 is a flowchart of a multi-voltage driving control method in an embodiment of the present disclosure.

An embodiment of a first aspect of the present disclosure provides a multi-voltage driving control method, as shown in FIG. 1, including the following steps:

S100: A voltage sample of a mains supply is obtained, and a voltage region corresponding to the voltage sample is determined.

S200: A driving circuit corresponding to the voltage region is determined according to the voltage region and a default working voltage region.

S300: An electrical appliance is controlled to operate by the driving circuit.

According to the multi-voltage driving control method provided by the present disclosure, a working voltage range of a mains supply is determined by detecting the mains supply in an electricity use environment; a working state of a circuit is dynamically adjusted according to a change of an input voltage of an electrical appliance, thereby achieving stable work of the electrical appliance in a multi-voltage environment. The multi-voltage driving control method is particularly applicable to a portable household appliance for travel, and the generality and convenience of the electrical appliance can be significantly improved.

Figure 2:
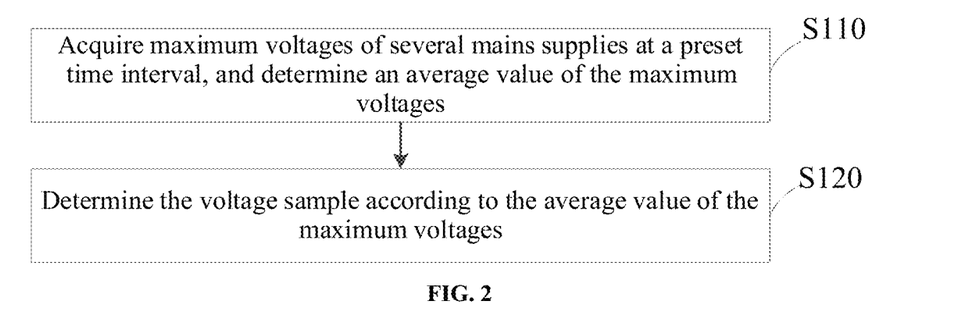
FIG. 2 is a flowchart of obtaining a voltage sample of a mains supply in an embodiment of the present disclosure.

Optionally, in some implementations of the embodiment of the first aspect, in S100, the step that a voltage sample of a mains supply is obtained, as shown in FIG. 2, which specifically includes:

S110: Maximum voltages of several mains supplies are acquired at a preset time interval, and an average value of the maximum voltages is determined.

S120: The voltage sample is determined according to the average value of the maximum voltages.

A value of a mains supply is obtained according to a divided voltage value rectified by a hardware circuit. A circuit is shown in a schematic diagram, with reference to the figure.

A software mains supply parameter, i.e. the voltage sample, is represented as: V_BUS.

Since V_BUS is a filter value after rectification and voltage division, V_BUS is a pulsating voltage. To accurately obtain a mains value from this pulsating voltage, apeak-mean-based software algorithm is used.

Figure 3:
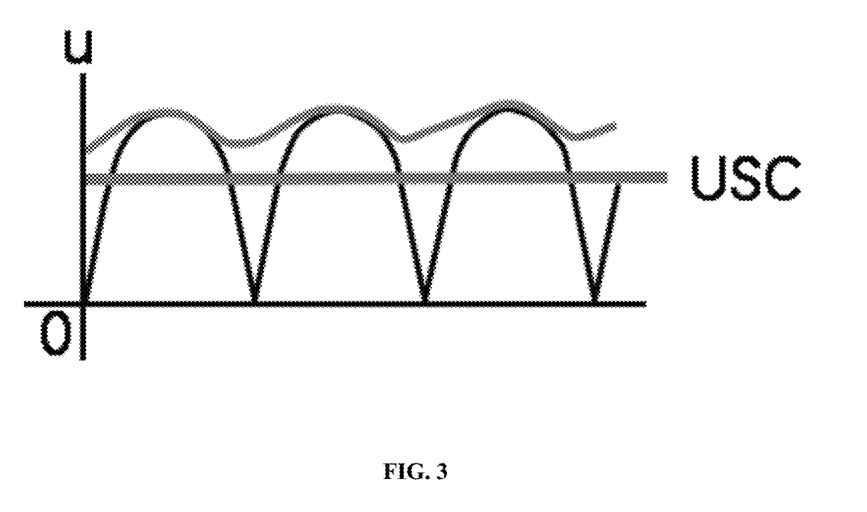
FIG. 3 is an oscillogram of a voltage sample in an embodiment of the present disclosure.

Referring to FIG. 3, the light-colored wavy lines in the figure represent V_BUS.

Optionally, in conjunction with the embodiment of the first aspect and the above implementation, in some implementations of the first aspect, the preset time interval is 12 milliseconds. A specific reference process is as follows:

The software algorithm for accurately obtaining V_BUS includes:

obtaining a maximum sampling value V_BUS-MAX every 12 ms;

obtaining 10 groups of V_BUS-MAX; and adding up the 10 groups of V_BUS-MAX, and obtaining an average value of V_BUS-AVG, wherein $$V\_BUS = V\_BUS\_AVG / 1.414.$$

A deviation between an actually measured calculated value V_BUS and an actually measured value is +2 V.

Specifically, in conjunction with the embodiment of the first aspect and the above implementation, in some implementations of the first aspect, in S200, the step that a driving circuit corresponding to the voltage region is determined, which specifically includes: When the voltage region and the default working voltage region have an intersection, the driving circuit is determined to be a first circuit; and when the voltage region and the default working voltage region have no intersection, the driving circuit is determined to be a second circuit. A working circuit arranged in an electrical appliance includes at least two modes. A multi-voltage driving control system or device in the electrical appliance compares an acquired and determined voltage region with a default working voltage region. If the voltage region is the same as or similar to the default working voltage region, the first circuit corresponding to the default working voltage region is still used as the working circuit. Otherwise, the second circuit corresponding to the voltage region but not the default working voltage region is used as the working circuit.

In conjunction with the first aspect and the above implementation, in some implementations of the first aspect, the first circuit corresponds to a first preset operating parameter table, and the second circuit corresponds to a second preset operating parameter table. A control parameter of the electrical appliance is optimized based on the V_BUS, and a function using V_BUS as an input variable and a corresponding control parameter as an output is constructed by a modeling control method: y=f(x), where x represents an independent variable of V_BUS, and y represents the output control parameter. A function mapping relationship is established between them.

Different function relationships are set up: A function using x=V_BUS as an independent variable, n=0, 1, 2, 3 . . . , where n represents different relationships.

$$f(n) = \sum_{n=0}^{\infty} f^{(n)}(x)$$

A motor and a heater of a blower are taken as an example. Specific function relationships are found in Table 1:

TABLE 1

| Parameter table | Parameter formula | Explanation of parameter |
|---|---|---|
| OVER_VOL | 1.2*V + S*5 | S represents a speed level of the motor, indicated by 1, 2, 3. V is a standard voltage value: 120 or 220 |
| UNDER_VOL | 0.8*V − S*5 | S represents a speed level of the motor, indicated by 1, 2, 3. V is a standard voltage value: 120 or 220 |
| OVER_CURR | I_Max/(V/120) | I_Max is a maximum overcurrent value V is a standard voltage value: 120 or 220 |
| LOSS_PHASE | I_Phase/(V/120) | I_Phase is a phase loss protection value. V is a standard voltage value: 120 or 220 |
| SMO Kslide | K_SMO_Kslide*120/ V_BUS | K_SMO_Kslide is a sliding mode estimation parameter coefficient, and V_BUS is a current actual voltage |
| θ_COMP | K_θ_COMP*120/ V_BUS | K_θ_COMP is an electrical angle parameter coefficient, and V_BUS is a current actual voltage |

TABLE 1-continued

| Parameter table | Parameter formula | Explanation of parameter |
|---|---|---|
| I_START | K_I_START*120/ V_BUS | K_I_START is an electrical angle parameter coefficient, and V_BUS is a current actual voltage |
| DUTY_MAX | K_DUTY_MAX*(1 − a*V/120) | K_DUTY_MAX is a maximum duty ratio; a is a proportionality coefficient; and V is a standard voltage value: 120 or 220 |
| HEATER_ Method | (V − 160 < 0)?0:1; ternary operation: outputting 0 within a voltage range of 0-160 V, and outputting 1 within a voltage range of 160-260 V. | At 0, heaters are connected in parallel. At 1, heaters are connected in series |
| HEATER_PID parameter | m = (V − 160 < 0)?0:1; ternary operation: outputting m = 0 within a voltage range of 0-160 V, and outputting m = 1 within a voltage range of 160-260 V. Tab[m]].P, Tab[m]].I, Tab[m]].D | Since PID parameters do not have a linear relationship, different voltage value lookup methods are used to find P, I, and D parameters from a TAB table. |

In conjunction with the first aspect and the above implementation, in some implementations of the first aspect, the default working voltage region is 220 V±10%.

In conjunction with the first aspect and the above implementation, in some implementations of the first aspect, the step that an electrical appliance is controlled to operate by the driving circuit includes: A motor and/or an electric heater is controlled to operate by the driving circuit.

For ease of understanding, the present disclosure provides a practical case:

A heater of a hair blower uses the multi-voltage driving control method provided in the present disclosure and is correspondingly designed with an adaptive switching circuit, including a dual-voltage thyristor control circuit, and a heating frame composed of three groups of heaters R1, R2, and R3.

By virtue of the above technical solution of the present disclosure, switching of a current direction of the heaters at a voltage of 100-120 $V_{AC}$ and a voltage of 220-240 $V_{AC}$ is completed.

Figure 4:
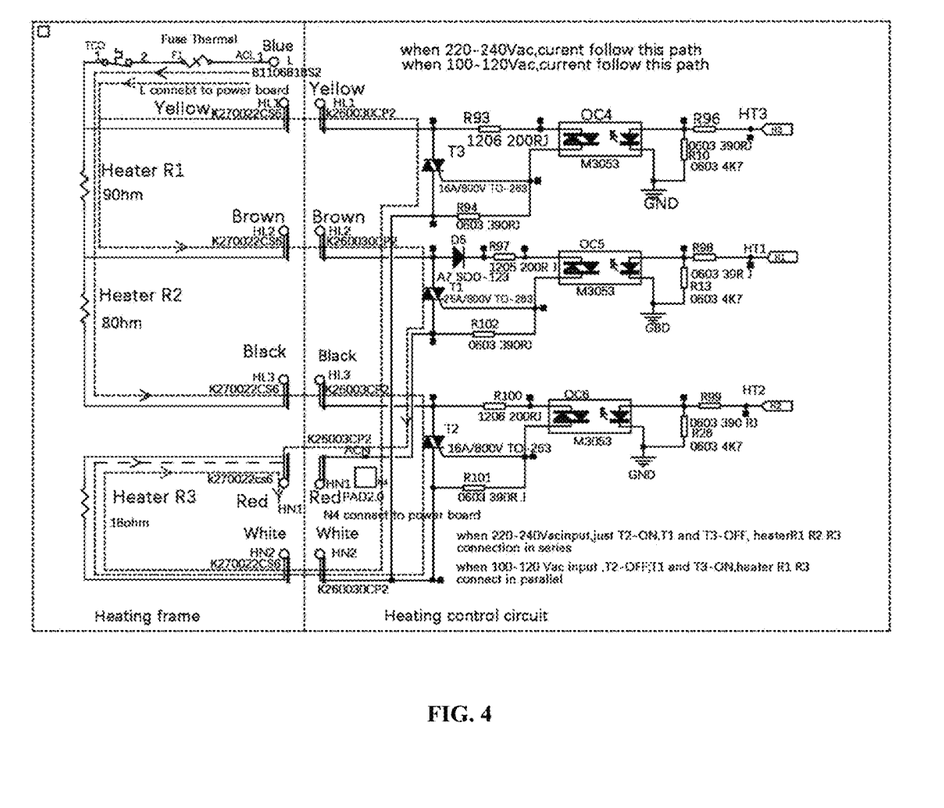
FIG. 4 is a schematic diagram of an operating circuit of a hair blower in an embodiment of the present disclosure.

As shown in FIG. 4, T1 is a bidirectional thyristor in a circuit, but by adding a diode D5 to a control circuit of an optocoupler, only unidirectional conduction is achieved, so that the hardware-controlled heater R1 can only work at half power.

T2 and T3 are bidirectional thyristors in the circuit, which can achieve bidirectional conduction normally. Resistance parameters of the three heaters are designed as follows: R1+R2=R3, and there may be a slight difference between R1 and R2. Meanwhile, the resistance value of R3 can be selected according to the power of the entire product, for example, within the range of 16-22Ω. Specific values are R1=9.5Ω, R2=8.5Ω, and R1+R2=R3=18Ω.

A micro control unit (MCU) control signal, an HT1 signal controls thyristor T1 through the optocoupler; HT2 controls thyristor T2 through optocoupler; HT3 controls thyristor T3 through the optocoupler; and the two groups of heaters R1 and R3 are connected in parallel at the voltage of 100-120 $V_{AC}$, to reduce the resistances of the heaters, $$P = (U^2/R1)/2 + U^2/R3.$$

The three groups of heaters are connected in series at the voltage of 220-240 $V_{AC}$, to increase the resistances of the heaters. A calculation formula is P=U^2/(R1+R2+R3).

Figure 5:
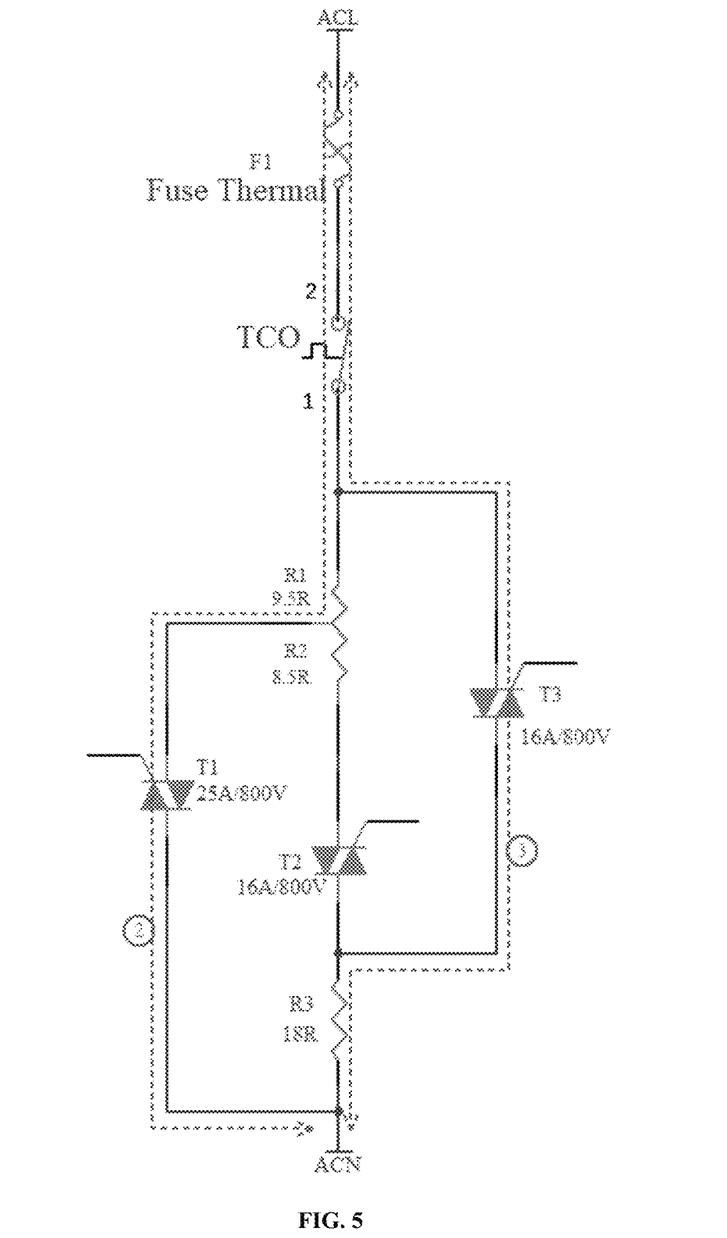
FIG. 5 is a schematic structural diagram of a first circuit of a hair blower in an embodiment of the present disclosure.

As shown in FIG. 5, in the dual-voltage thyristor control circuit, at the voltage of 100-120 $V_{AC}$, thyristors T1 and T3 are turned off, and thyristor T2 is turned on. The current direction of one group is ACL-F1-TCO-T3-R3-CAN, and the current direction of another group is ACL-F1-TCO-R1-T1-CAN. The heaters R1 and R3 are connected in parallel, and the final power of the two groups of heaters is calculated at 115 $V_{AC}$:

$$(115*115/11)/2 + 115*115/22 = 1202 \text{ W}.$$

Figure 6:
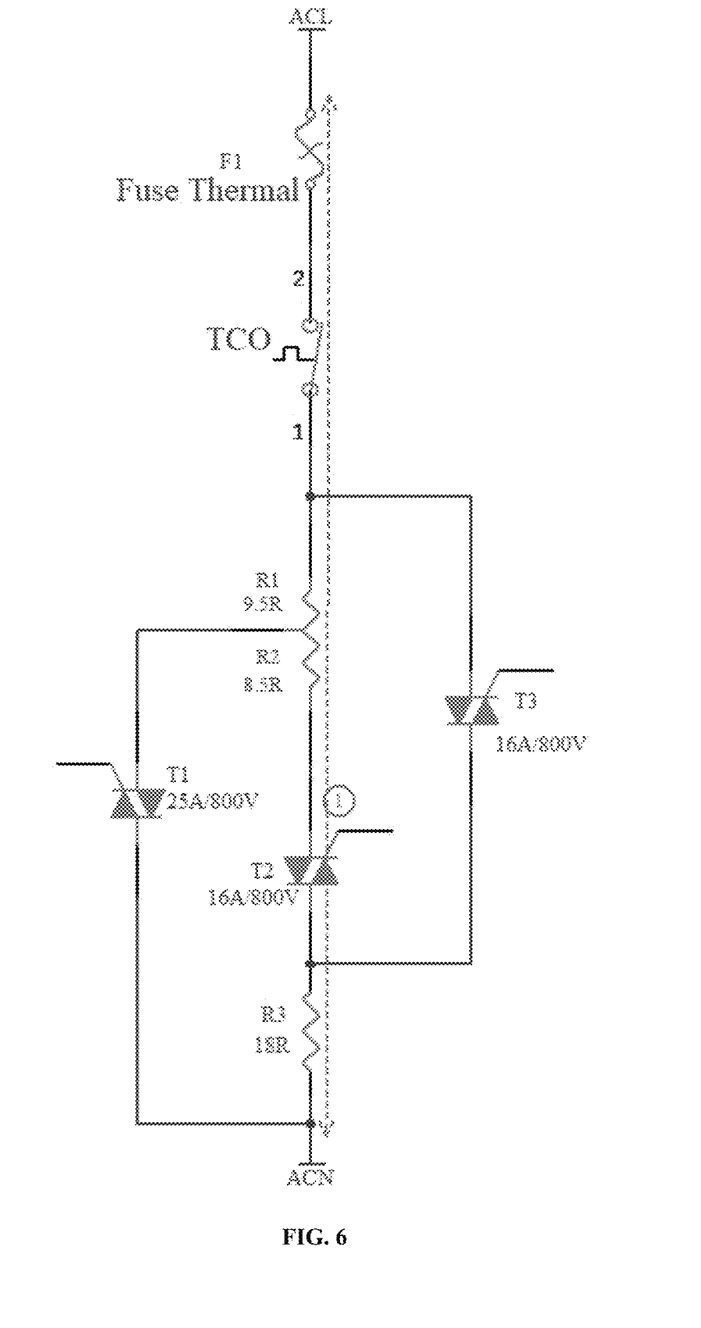
FIG. 6 is a schematic structural diagram of a second circuit of a blower in an embodiment of the present disclosure.

As shown in FIG. 6, at the voltage of 220-240 $V_{AC}$, thyristor T2 is turned on, and thyristors T1 and T3 are turned off. The current direction is ACL-F1-TCO-T3-R3-CAN. The heaters R1, R2, and R3 are connected in series, and the final power of the two groups of heaters is calculated at 230 $V_{AC}$: 230*230/(11+11+22)=1202 W.

As mentioned above, in two different voltage input ranges, the overall power of the heating frame of the hair dryer is the same. Through a software method, different working circuits are selected according to different mains supply ranges, which improves the adaptability of the hair dryer to an electricity use environment without increasing the cost of the heaters of the hair blower.

Figure 7:
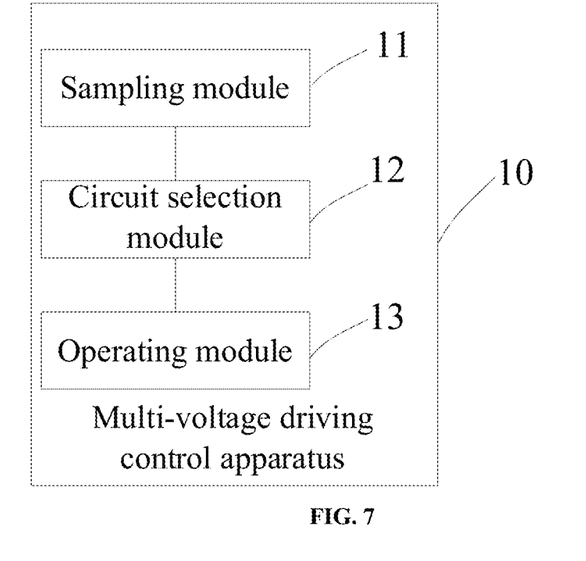
FIG. 7 is a structural block diagram of a multi-voltage driving control apparatus in an embodiment of the present disclosure.

In a second aspect, the present disclosure provides a multi-voltage driving control apparatus 10, as shown in FIG. 7, including a sampling module 11, a circuit selection module 12, and an operating module 13. The sampling module 11 is configured to: obtain a voltage sample of a mains supply, and determine a voltage region corresponding to the voltage sample. The circuit selection module 12 is configured to determine a driving circuit corresponding to the voltage region according to the voltage region and a default working voltage region. The operating module 13 is configured to control an electrical appliance to operate by the driving circuit.

Optionally, the sampling module 11 obtains a voltage sample of a mains supply, which includes: acquiring maximum voltages of several mains supplies at a preset time interval, and determining an average value of the maximum voltages; and determining the voltage sample according to the average value of the maximum voltages. Optionally, the preset time interval is 12 milliseconds.

Optionally, the circuit selection module 12 determines a driving circuit corresponding to the voltage region, which specifically includes: when the voltage region and the default working voltage region have an intersection, determining the driving circuit to be a first circuit; and when the voltage region and the default working voltage region have no intersection, determining the driving circuit to be a second circuit. Optionally, the first circuit corresponds to a first preset operating parameter table, and the second circuit corresponds to a second preset operating parameter table.

Specifically, the default working voltage region is 220 V±10%.

Optionally, the operating module 13 controls an electrical appliance to operate by the driving circuit, which includes: controlling a motor and/or an electric heater to operate by the driving circuit.

According to the multi-voltage driving control apparatus provided by the present disclosure, a working voltage range of a mains supply is determined by detecting the mains supply in an electricity use environment; a working state of a circuit is dynamically adjusted according to a change of an input voltage of an electrical appliance, thereby achieving stable work of the electrical appliance in a multi-voltage environment. The multi-voltage driving control method is particularly applicable to a portable household appliance for travel, and the generality and convenience of the electrical appliance can be significantly improved.

Based on the same technical concept, the present disclosure provides a multi-voltage driving control device, including:

a processor;
a memory, electrically connected to the processor; and
at least one program, stored in the memory and configured to be run by the processor. The at least one program is configured to: implement the multi-voltage driving control method provided in any of the embodiments in the first aspect of the present disclosure.

A person skilled in the art can understand that the multi-voltage driving control device provided by the embodiments of the present disclosure can be specifically designed and manufactured for a desired purpose, or can further include known devices in general-purpose computers. These devices have computer programs stored thereon. These computer programs are selectively activated or reconstructed. The computer programs can be stored in a device (e.g. computer)-readable medium or in any type of medium suitable for storing electronic instructions and separately coupled to a bus.

Compared with the prior art, the multi-voltage driving control device provided by the present disclosure has the following beneficial technical effects: A working voltage range of a mains supply is determined by detecting the mains supply in an electricity use environment; a working state of a circuit is dynamically adjusted according to a change of an input voltage of an electrical appliance, thereby achieving stable work of the electrical appliance in a multi-voltage environment. The multi-voltage driving control method is particularly applicable to a portable household appliance for travel, and the generality and convenience of the electrical appliance can be significantly improved.

Figure 8:
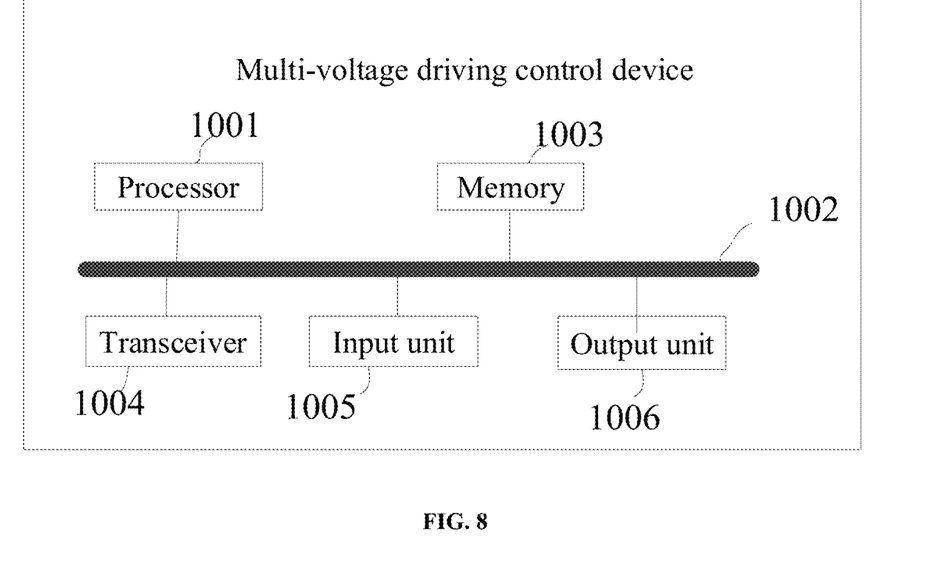
FIG. 8 is a structural block diagram of a multi-voltage driving control device in an embodiment of the present disclosure.

An optional embodiment of the present disclosure provides a multi-voltage driving control device, as shown in FIG. 8, the multi-voltage driving control device 1000 shown in FIG. 8 includes a processor 1001 and a memory 1003. The processor 1001 and the memory 1003 are electrically connected, such as, through a bus 1002.

The processor 1001 can be a Central Processing Unit (CPU), a general-purpose processor, a Digital Signal Processor (DSP), an Application Specific Integrated Circuit (ASIC), a Field Programmable Gate Array (FPGA), or any other programmable logic devices, transistor logic devices, hardware components, or any combination thereof. Various exemplary logical blocks, modules, and circuits described in conjunction with the content disclosed in the present disclosure can be implemented or executed. The processor 1001 can also be a combination that implements a computing function, such as a combination containing one or more microprocessors, and a combination of a DSP and a microprocessor.

The bus 1002 may include a channel for transmitting information between the aforementioned components. The bus 1002 can be a Peripheral Component Interconnect (PCI) bus, an Extended Industry Standard Architecture (EISA) bus, or the like. The bus 1002 may be divided into an address bus, a data bus, a control bus, and the like. For ease of representation, only one thick line is used in FIG. 8, but it does not mean that there is only one bus or one type of bus.

The memory 1003 can be a Read-Only Memory (ROM) or other types of static storage devices that can store static information and instructions, a Random Access Memory (RAM), or other types of dynamic storage devices that can store information and instructions, or an Electrically Erasable Programmable Read Only Memory (EEPROM), a Compact Disc Read-Only Memory (CD-ROM), or other optical storages, optical disc storage (including a compact optical disc, a laser disc, an optical disc, a digital versatile disc, a Blu ray disc, and the like), a magnetic disk storage medium or other magnetic storage devices, or any other media that can be used to carry or store desired program codes in the form of instructions or data structures and can be accessed by a computer, but not limited to these.

Optionally, the multi-voltage drive control device 1000 may further include a transceiver 1004. The transceiver 1004 can be configured for signal reception and transmission. The transceiver 1004 can allow the multi-voltage drive control device 1000 to wirelessly or wiredly communicate with other devices to exchange data. It should be noted that in practical applications, the number of the transceiver 1004 is not limited to one.

Optionally, the multi-voltage drive control device 1000 may further include an input unit 1005. The input unit 1005 may be configured to receive input numeric, character, image and/or sound information, or generate key signal inputs related to user settings and function control of the multi-voltage drive control device 1000. The input unit 1005 may include, but not limited to, one or more of a touch screen, a physical keyboard, a function key (such as a volume control key or an on/off key), a track ball, a mouse, a joystick, a photographing apparatus, a pickup.

Optionally, the multi-voltage driving control device 1000 may further include an output unit 1006. The output unit 1006 can be configured to output or display information processed by the processor 1001. The output unit 1006 may include but is not limited to one or more of a display apparatus, a speaker, a vibration apparatus, and the like.

Although FIG. 8 shows the multi-voltage driving control device 1000 with multiple apparatuses, it should be understood that the device is not required to implement or have all the apparatuses shown, and can alternatively implement or have more or fewer apparatuses.

Optionally, the memory 1003 is configured to store application program codes for executing the solutions of the present disclosure, and is controlled for execution by the processor 1001. The processor 1001 is configured to execute the application program codes stored in the memory 1003, to implement any multi-voltage driving control method provided in the embodiments of the present disclosure.

Based on the same invention concept, the embodiments of the present disclosure provide a computer-readable storage medium having a computer program stored thereon. Running of the program by a processor implements any multi-voltage driving control method provided in the embodiments of the present disclosure.

Those skilled in the art will understand that various steps, measures, and schemes in the operations, methods, and procedures discussed in the present disclosure may be alternated, modified, combined, or deleted. Further, other steps, measures, and schemes in the operations, methods, and procedures discussed in the present disclosure may also be alternated, modified, rearranged, split, combined, or deleted. Further, steps, measures, and schemes in the operations, methods, and procedures disclosed in the prior art and the present disclosure may also be alternated, modified, rearranged, split, combined, or deleted.

The terms "first" and "second" are used for descriptive purposes only and are not to be construed as indicating or implying relative importance or to implicitly indicate the number of technical features indicated. Thus, features defined as "first" and "second" explicitly or implicitly include one or more of the features. In the descriptions of the present disclosure, "a plurality" means two or more, unless otherwise specified.

It is understood that although all the steps in the flowchart of the accompanying drawings are displayed in sequence according to the instructions of the arrows, these steps are not necessarily performed in sequence according to the sequence indicated by the arrows. Unless otherwise explicitly specified in the present disclosure, execution of these steps is not strictly limited, and the steps may be performed in other sequences. Moreover, at least some of the steps in the flowcharts of the accompanying drawings may include a plurality of substeps or a plurality of stages. These substeps or stages are not necessarily executed at the same time, but may be executed at different time. Execution of these substeps or stages is not necessarily performed in sequence, but may be performed in turn or alternately with other steps or substeps in other steps or at least some of the stages.

The foregoing descriptions are some implementations of the present disclosure only. It is noted that a person of ordinary skill in the art may make some improvements and modifications without departing from the principle of the present disclosure and the improvements and modifications shall fall within the protection scope of the present disclosure.

What is claimed is:

1. A multi-voltage driving control method, comprising the following steps:
   obtaining a voltage sample of a mains supply, and determining a voltage region corresponding to the voltage sample;
   determining a driving circuit corresponding to the voltage region according to the voltage region and a default working voltage region; and
   controlling an electrical appliance to operate by the driving circuit;
   wherein the step of obtaining a voltage sample of a mains supply comprises: acquiring maximum voltages of several mains supplies at a preset time interval, and determining an average value of the maximum voltages; and determining the voltage sample according to the average value of the maximum voltages; the preset time interval is 12 milliseconds.

2. The multi-voltage driving control method according to claim 1, wherein the step of determining a driving circuit corresponding to the voltage region comprises:
   when the voltage region and the default working voltage region have an intersection, determining the driving circuit to be a first circuit; and
   when the voltage region and the default working voltage region have no intersection, determining the driving circuit to be a second circuit.

3. The multi-voltage driving control method according to claim 2, wherein the first circuit corresponds to a first preset operating parameter table, and the second circuit corresponds to a second preset operating parameter table.

4. The multi-voltage driving control method according to claim 1, wherein the default working voltage region is 220 V±10%.

5. The multi-voltage driving control method according to claim 2, wherein the default working voltage region is 220 V±10%.

6. The multi-voltage driving control method according to claim 1, wherein the step of controlling an electrical appliance to operate by the driving circuit comprises: controlling a motor and/or an electric heater to operate by the driving circuit.

7. A multi-voltage driving control apparatus, comprising:
a sampling module, configured to: obtain a voltage sample of a mains supply, and determine a voltage region corresponding to the voltage sample; wherein the step of obtaining a voltage sample of a mains supply comprises: acquiring maximum voltages of several mains supplies at a preset time interval, and determining an average value of the maximum voltages; and determining the voltage sample according to the average value of the maximum voltages; the preset time interval is 12 milliseconds;
a circuit selection module, configured to determine a driving circuit corresponding to the voltage region according to the voltage region and a default working voltage region; and
an operating module, configured to control an electrical appliance to operate by the driving circuit.

* * * * *